US006195272B1

(12) United States Patent
Pascente

(10) Patent No.: US 6,195,272 B1

(45) Date of Patent: Feb. 27, 2001

(54) PULSED HIGH VOLTAGE POWER SUPPLY RADIOGRAPHY SYSTEM HAVING A ONE TO ONE CORRESPONDENCE BETWEEN LOW VOLTAGE INPUT PULSES AND HIGH VOLTAGE OUTPUT PULSES

(76) Inventor: Joseph E. Pascente, 71 Regent Dr., Oak Brook, IL (US) 60522

( * ) Notice: Subject to any disclaimer, the term of this patent is extended or adjusted under 35 U.S.C. 154(b) by 0 days.

(21) Appl. No.: 09/527,136

(22) Filed: Mar. 16, 2000

(51) Int. Cl.[7] .................................................. H02M 3/335

(52) U.S. Cl. .............................................. 363/21; 363/131

(58) Field of Search ................................ 363/21, 97, 131

(56) References Cited

U.S. PATENT DOCUMENTS

| | | | |
|---|---|---|---|
| 4,129,783 | 12/1978 | Houston | 250/445 T |
| 4,136,281 | 1/1979 | Murray | 250/336 |
| 4,137,454 | 1/1979 | Brandon, Jr. | 250/402 |
| 4,355,276 | 10/1982 | Vittay | 322/4 |
| 4,359,660 | 11/1982 | Smith et al. | 378/119 |
| 4,387,467 | 6/1983 | Kirby | 378/68 |
| 4,533,946 | 8/1985 | Yasuhara et al. | 358/111 |
| 4,544,948 | 10/1985 | Okazaki | 358/111 |
| 4,602,376 | 7/1986 | Doucet et al. | 378/119 |
| 4,614,999 | 9/1986 | Onodera et al. | 363/28 |
| 4,628,355 | 12/1986 | Ogura et al. | 358/111 |
| 4,680,693 | 7/1987 | Carron | 363/98 |
| 4,694,479 | 9/1987 | Bácskai et al. | 378/58 |
| 4,706,268 | 11/1987 | Onodera | 378/99 |
| 4,757,524 | 7/1988 | Laul | 378/122 |
| 4,823,250 | 4/1989 | Kolecki et al. | 363/71 |
| 4,879,734 | 11/1989 | Schreckendgust et al. | 378/57 |
| 4,947,415 | 8/1990 | Collins | 378/122 |
| 4,961,209 | 10/1990 | Rowlands et al. | 378/29 |
| 5,044,004 | 8/1991 | Collins et al. | 378/101 |
| 5,077,771 | 12/1991 | Skillicorn et al. | 378/102 |
| 5,222,113 | 6/1993 | Thieme et al. | 378/43 |
| 5,241,260 | 8/1993 | Beland | 323/270 |
| 5,391,977 | 2/1995 | Beland | 323/268 |
| 5,426,686 | 6/1995 | Rentzepis et al. | 378/34 |
| 5,438,604 | 8/1995 | Horbaschek | 378/98.2 |
| 5,550,887 | 8/1996 | Schmal et al. | 378/43 |
| 5,608,774 | 3/1997 | Polichar et al. | 378/98.8 |
| 5,666,393 | 9/1997 | Annis | 378/57 |
| 5,754,414 * | 5/1998 | Hannington | 363/21 |
| 5,828,726 | 10/1998 | Polichar et al. | 378/98.2 |
| 5,909,478 | 6/1999 | Polichar et al. | 378/98.2 |
| 5,930,331 | 7/1999 | Rentzepis et al. | 378/136 |

* cited by examiner

*Primary Examiner*—Shawn Riley
(74) *Attorney, Agent, or Firm*—Marshall, O'Toole, Gerstein, Murray & Borun

(57) ABSTRACT

A pulsed high voltage power supply for use in a radiography system includes a high voltage step up transformer having a primary winding with first and second ends and a secondary winding connected to a radiation source. The power supply further includes a low voltage power source coupled to the first end of the primary winding and a switching circuit coupled to the second end of the primary winding. The switching circuit generates a switching signal having a series of pulses such that each pulse from the series of pulses causes the high voltage step up transformer to generate a high voltage pulse across the first and second electrodes to form a series of substantially uniform high slew rate high voltage pulses across the first and second electrodes of the radiation source.

22 Claims, 4 Drawing Sheets

PULSED HIGH VOLTAGE POWER SUPPLY RADIOGRAPHY SYSTEM HAVING A ONE TO ONE CORRESPONDENCE BETWEEN LOW VOLTAGE INPUT PULSES AND HIGH VOLTAGE OUTPUT PULSES

BACKGROUND OF THE INVENTION

1. Field of the Invention

The invention relates generally to pulsed high voltage power supplies and, more particularly, to a pulsed high voltage power supply for use within a radiography system.

2. Description of Related Technology

Generally speaking, radiography and fluroscopy systems include a radiation source that emits high energy photons (e.g., X-rays, gamma rays, etc.) toward a target object and a radiation detector that measures the energy level of photons which have passed through the target object. The radiation detector may, for example, be a charge coupled device (CCD) or a fluoroscope that detects the differential transmission of the high energy photons through the target object to produce images of structures within the target object. These internal images of the target object may be developed and displayed using photographic film and/or may be displayed using a video monitor.

Radiography systems are used in a wide variety of applications and are particularly useful in examining and diagnosing problems with the internal structures of a target object. For instance, in the field of medical diagnostics, medical practitioners use radiography systems to produce radiographic images that reveal the internal conditions of a patient's body. Specifically, radiography systems may be used to assess the condition of damaged or diseased organs, bones, etc. and/or may be used to determine the location of a foreign object within the patient's body. Additionally, radiography systems may be used to determine the internal conditions of machinery and components of a physical plant (e.g., pipes, valves, etc.) to perform preventative maintenance or may be used to perform quality control checks of products being manufactured within a high speed production process.

Of particular concern in using radiography systems for medical applications is that human tissues may be easily damaged by the large doses of radiation which are imparted by conventional radiography systems. Tissue damage is especially critical within the field of pediatrics because children are highly susceptible to tissue damage from exposure to high doses of radiation. In fact, medical guidelines recommend X-ray exposure levels for children that are substantially reduced with respect to the levels acceptable for adult patients. As a result, important developments within the field of radiography have been directed to minimizing the exposure of patients (and medical personnel operating the radiography equipment) to radiation while maintaining or improving radiographic imaging capability.

Additional advances in radiography have been directed to the development of quasi real time imaging capability. With quasi real time imaging, successive radiographic images are acquired at a rate that is perceptible to the human eye (e.g., less than 30 updates or frames per second) and then displayed via a video monitor to a user. Quasi real time radiographic images are particularly useful within the field of medical diagnostics because quasi real time images allow medical practitioners to inspect moving organs, such as the heart, in operation. Additionally, quasi real time radiographic images may be used to view the internal structures of subjects (e.g., patients or any other target objects) that are moving, either deliberately or inadvertently, without blurring of the images. However, because quasi real time video images are updated at rate which is readily perceived by the human eye, the video images "flicker" and, as a result, are generally difficult to view and may be of limited use for diagnostic purposes.

Still other efforts within the field of radiography have been directed to developing portable radiography systems that provide quasi real time imaging capability while addressing the above-noted need to minimize the radiation dosage imparted to a target object. Additionally, these portable radiography systems attempt to provide attributes desirable of equipment designed for field use such as a low cost, lightweight, extended battery powered operation, etc.

Conventional radiography systems typically reduce the radiation dosage imparted to the target object by pulsing the output of the radiation source. In general, these conventional pulsed radiography systems turn the radiation source on and off at a predetermined frequency and duty cycle for a predetermined period of time, which results in an integrated radiation dosage that is at or below desired safe levels. The radiographic images produced by these pulsed systems are acquired during the time intervals when the radiation source is on and are displayed to the user while the radiation source is off and until another image is acquired and ready for display. Typically, these quasi real time medical radiography systems display the images acquired while the radiation source is on using a video monitor that is synchronized with the acquisition of the images.

Traditionally, pulsed radiography systems use an X-ray tube as a radiation source. One common technique of providing a pulsed source of X-rays uses a grid controlled X-ray tube having a constant cathode to anode potential. In a grid controlled configuration, the output of the X-ray tube is gated on and off by applying a series of pulses to the grid terminal, which controls the current flowing between the anode and cathode of the X-ray tube, to generate a corresponding series of X-ray pulses that are directed toward the target object. However, grid controlled X-ray tube configurations are undesirable for many applications because grid controlled configurations result in a radiography system that is heavy, electrically inefficient, and expensive to produce.

More specifically, grid controlled X-ray tubes are significantly more expensive than non-gridded tubes. For example, a grid controlled X-ray tube may cost approximately $10,000, whereas a non-gridded tube having comparable X-ray output characteristics may only cost approximately $200. Additionally, because grid controlled configurations require a constant high voltage supply to the anode and cathode electrodes of the X-ray tube, the radiography system power supply and the grid controlled X-ray tube continuously dissipate energy and must be capable of operating under high quiescent power levels and high temperatures. These high quiescent energy levels and high operating temperatures increase system material costs, system weight, and reduce overall system performance.

In fact, many commercially available pulsed radiography systems based on grid controlled X-ray tubes, such as those manufactured by Philips Inc., employ oil cooling apparatus and/or must be periodically turned off to prevent overheating and system failure. Further, because grid-controlled X-ray tubes operate at a relatively high temperature, the life expectancy of such tubes is greatly diminished. This reduced life expectancy significantly increases operating costs over the life of the radiography system due to the high costs associated with repeated replacement of a grid controlled X-ray tube. Thus, radiography systems based on grid controlled X-ray tube configurations are undesirable for many radiography applications, particularly for field use applications requiring low cost, reliability, battery powered operation, and ease of portability.

Another common method of providing a pulsed source of X-rays turns the supply voltage (i.e., the anode to cathode voltage) of a non-gridded X-ray tube on and off at a predetermined frequency and duty cycle. Typically, such pulsed supply configurations apply a pulse waveform to the primary winding of a step up transformer and use a conventional diode-based voltage multiplier circuit to further increase the output voltage of the transformer secondary winding to generate a high voltage pulse waveform that is applied across the anode and cathode electrodes of the non-gridded X-ray tube. While these conventional pulsed supply configurations can use relatively inexpensive non-gridded X-ray tubes, they have significant drawbacks. For instance, the diode-based voltage multiplier circuit introduces a large time constant, which results in a low slew rate and a low bandwidth which, in turn, results in the application of a relatively large radiation dosage for each radiographic image.

FIG. 1 illustrates, by way of example only, a supply voltage pulse waveform 10 having a large time constant and a low slew rate such as that which would typically be found in the above-described pulsed supply voltage configurations. Because the energy level of the X-rays emitted by a pulsed supply X-ray tube varies in proportion to the supply voltage, the penetration effectiveness of the X-ray output changes over the duration of the pulse waveform 10 and only a portion of the pulse waveform 10 provides photon energy levels that are sufficient to penetrate the target object and which are useful for imaging purposes. For example, if a supply voltage of 70 kilovolts (kV) corresponds to the minimum photon energy level sufficient for penetration of the target object and imaging of structures within the target object, then only a central portion 12 of the pulse waveform 10 is useful for imaging purposes and portions 14 and 16 surrounding the central portion 12 produce photons or "soft" X-rays that are absorbed by the target object and, thus, are not useful for imaging purposes.

Furthermore, the central portion 12 of the pulse waveform 10 may produce a poor quality image because the energy level of the penetrating photons emitted within the central portion 12 varies significantly. As is generally known, a wide variation in the energy level of penetrating photons produces a "fuzzy" or unclear image of the internal structures of the target object. Some conventional radiography systems attempt to improve the quality of such unclear images by using complex software routines that selectively parse data associated with the detection of penetrating photons to effectively narrow the central region 12 and/or use complex correction algorithms to compensate for the effects of the variable energy levels of the penetrating photons. In any case, the low slew rate associated with conventional pulsed supply radiography systems is undesirable because only a small portion of the X-rays imparted to the target object are useful for imaging purposes and, as a result, the target object must be exposed to a relatively large dosage of X-rays to produce a useful image. Additionally, due to the low slew rate, the X-ray tube must remain turned on for a relatively long period of time to produce a useful image. Because the X-ray tube remains turned on for a relatively long period of time, a relatively large amount of power is dissipated by the X-ray tube and the radiography system as a whole, which increases operating temperatures of the system, reduces the operating life of the X-ray tube, prohibits efficient battery powered operation, and may require a periodic shut down of the system to prevent overheating of the system.

Yet another method of providing a pulsed source of X-rays uses a capacitive discharge configuration that is based on a "flash" X-ray radiation source, which allows a charge to build over time and which arcs over to generate an X-ray output when a breakdown voltage is reached. While these flash X-ray systems provide high slew rates and extremely narrow X-ray pulse waveforms (e.g., 50 nanoseconds in duration), flash X-ray systems are undesirable for many radiography applications because flash X-ray systems provide a relatively uncontrolled X-ray output energy level. Specifically, the arc over point of the flash X-ray device varies significantly from pulse to pulse and varies significantly over time as the flash X-ray device ages (i.e., wears due to electrode erosion). Variations in the arc-over point result in a variation in the energy level of the penetrating photons that are generated during the discharge cycle, which results in an uncontrolled and variable radiation dose on a per pulse basis. Such variability in the radiation dose and energy level results in both poor imaging capabilities and unpredictable radiation effects on the target object, which may be a human body. Additionally, flash X-ray devices utilize relatively high peak electrode currents that cause severe erosion of the electrode surfaces, which substantially reduces the life of the flash X-ray device, and cause the output beam or spot to move over time.

SUMMARY OF THE INVENTION

In accordance with one aspect of the invention, a pulsed high voltage power supply for use in a radiography system having a radiation source with first and second electrodes includes a high voltage step up transformer having a primary winding with first and second ends and a secondary winding connected to the first electrode. The power supply further includes a low voltage power source coupled to the first end of the primary winding and a switching circuit coupled to the second end of the primary winding. The switching circuit generates a switching signal having a series of pulses such that each pulse from the series of pulses causes the high voltage step up transformer to generate a high voltage pulse across the first and second electrodes to form a series of substantially uniform high voltage pulses across the first and second electrodes.

The substantially uniform high voltage pulses may repeat at a rate of greater than about 25 per second to form a high voltage pulse waveform having a duty cycle of less than about 20%. Additionally, the high voltage step up transformer may also generate a damped oscillating waveform immediately following each of the high voltage pulses from the series of substantially uniform high voltage pulses.

Each pulse from the series of substantially uniform high voltage pulses may have a peak voltage of greater than about 5 kilovolts, may provide a voltage greater than about 5 kilovolts for greater than about 25 microseconds, and may have a slew rate of greater than about 500 volts per microsecond.

The pulsed high voltage power supply described herein may use a X-ray tube such as a non-gridded tube as a radiation source, or may use any other radiation source suitable for radiographic imaging. The low voltage power source may be substantially direct current power source, such as a battery, and the high voltage step up transformer may have a turns ratio of greater than about 50:1.

In accordance with another aspect of the invention a pulsed high voltage power supply for use in a radiography system having a radiation source with first and second high voltage electrodes includes a first high voltage step up transformer having a first primary winding with first and second ends and a first secondary winding connected to the first electrode. The power supply further includes a second high voltage step up transformer having a second primary winding with third and fourth ends and a second secondary winding connected to the first secondary winding and to the second electrode. The power supply also includes a low voltage power source coupled to the first end of the first primary winding and to the third end of the second primary winding and a switching circuit having a first switching signal output coupled to the second end of the first primary winding and a second switching signal output coupled to the fourth end of the second primary winding. The first and second switching signal outputs provide a first and second series of pulses respectively. Each pulse from the first series of pulses causes the first high voltage step up transformer to provide a first high voltage pulse to one of the first and second electrodes and each pulse from the second series of pulses causes the second high voltage step up transformer to provide a second high voltage pulse to the other one of the first and second electrodes so that a series of substantially uniform high voltage pulses are provided across the first and second electrodes.

The invention itself, together with further objects and attendant advantages, will best be understood by reference to the following detailed description, taken in conjunction with the accompanying drawings.

DETAILED DESCRIPTION OF THE PREFERRED EMBODIMENTS

The pulsed high voltage power supply described herein provides a high voltage pulse waveform that may be applied as a pulsed supply voltage across the anode and cathode electrodes of a radiation source within a radiography system such as, for example, a fluoroscopy system. Generally speaking, the high voltage power supply described herein provides a high voltage pulse waveform to the radiation source so that non-penetrating (i.e., absorbed) photons are minimized and so that a substantial portion of the radiation emitted by the radiation source during a radiation pulse may be used for radiographic imaging purposes. As a result, the pulsed high voltage power supply described herein allows a radiography system to produce high quality images while the radiation imparted to the target object, which may be a human body or any other object, is minimized.

More specifically, the high voltage power supply described herein uses a switching circuit and a high turns ratio step up transformer to produce a high voltage pulse waveform having a high slew rate and a substantially consistent peak voltage. The high slew rate allows the radiography system to operate continuously at a low duty cycle so that the radiation source operates at a relatively low temperature, which provides for a longer life expectancy of the radiation source. Additionally, as a result of the high slew rate, the high voltage pulses provide a large proportion of penetrating photons (which are useful for imaging purposes) so that the total radiation dosage imparted to a target object to form each image may be minimized. Likewise, the high slew rate minimizes the amount of energy required to produce a useful radiographic image so that power consumption may be substantially reduced to facilitate extended battery powered operation of the radiography system. Still further, the high slew rate allows the radiation source to be operated at a frequency suitable for real time imaging applications (i.e., greater than about 30 images per second) and the consistent peak voltage provides a clear, sharp image without having to apply complex software corrections to the image information.

Figure 1:
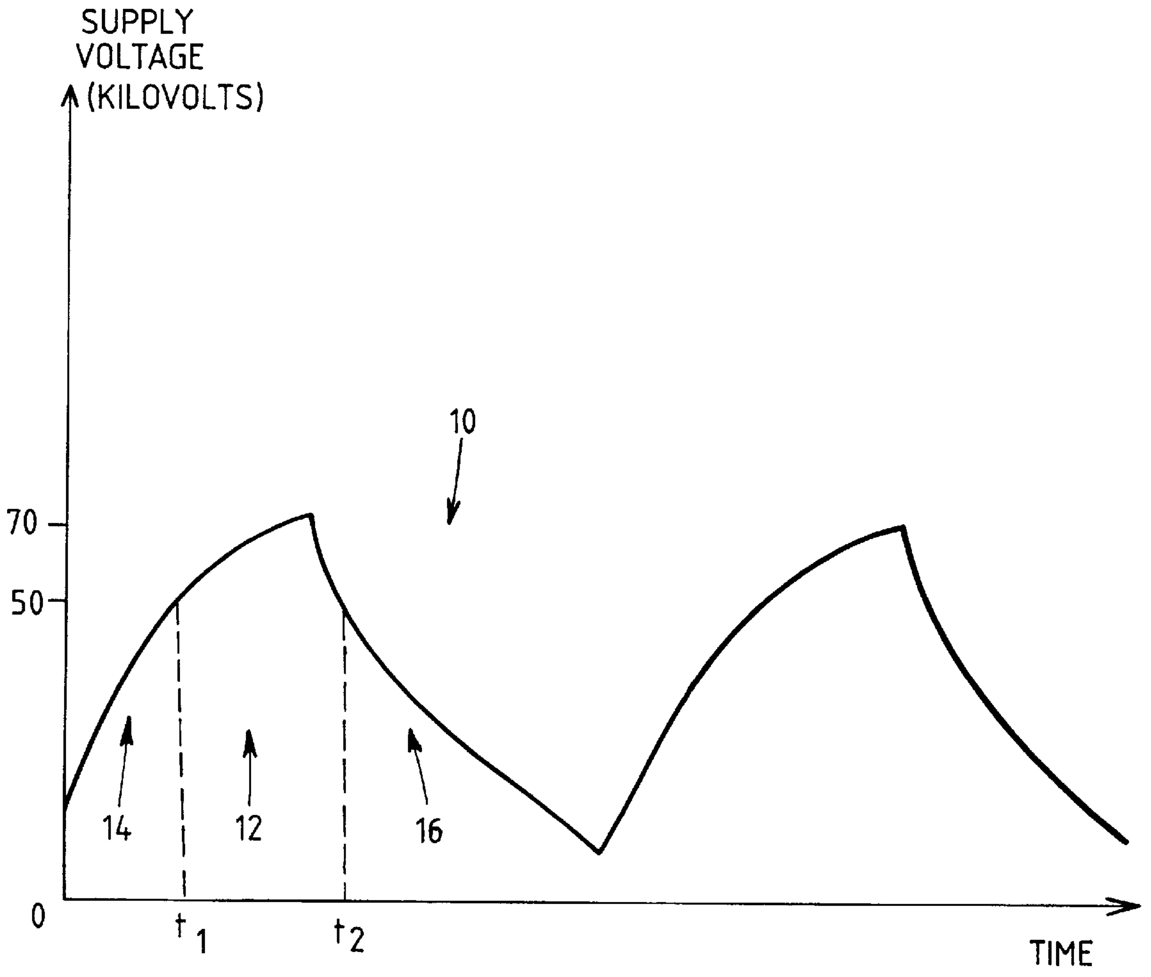
FIG. 1 PRIOR ART
FIG. 1 illustrates, by way of example only, a supply voltage pulse waveform having a large time constant and a low slew rate that would typically be found in prior art pulsed power supply configurations.
Figure 2:
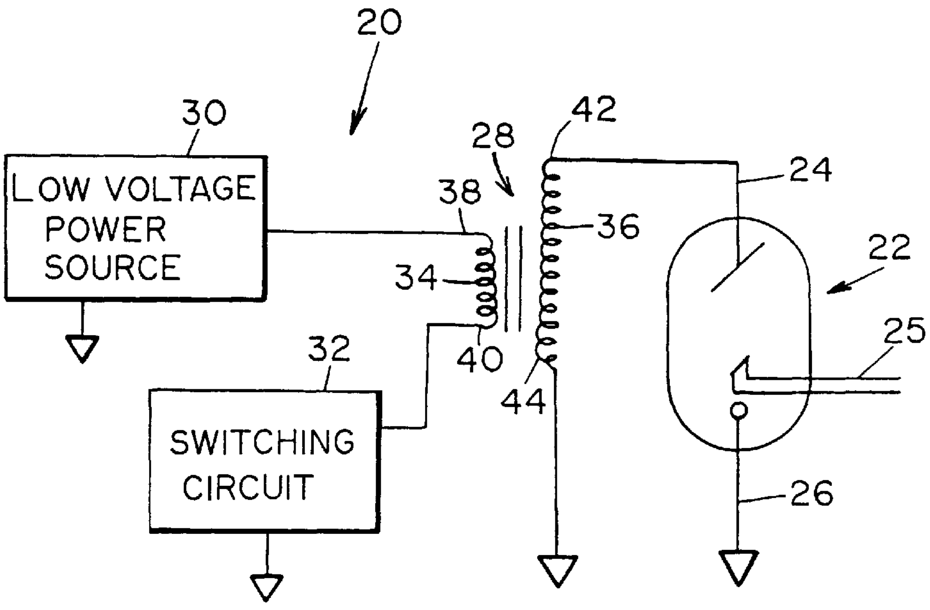
FIG. 2 is an exemplary schematic block diagram of a pulsed high voltage power supply circuit that may be used to supply power to a radiation source within a radiography system.

FIG. 2 is an exemplary schematic block diagram of a pulsed high voltage power supply circuit 20 that may be used to supply power to a radiation source 22 having a first electrode 24, a filament 25, and a second electrode 26. The radiation source 22 may be a conventional non-gridded X-ray tube or, alternatively, may be any other radiation device which is suitable for emitting pulses of photonic radiation which may be used to produce radiographic images.

The pulsed high voltage power supply circuit 20 includes a high voltage step up transformer 28, a low voltage power source 30, and a switching circuit 32. The high voltage step up transformer 22 has a primary winding 34 and a secondary winding 36. The primary winding 34 has first end 38, which is coupled to the low voltage power source 30, and a second end 40 that is coupled to the switching circuit 32. The secondary winding 36 has a first end 42, which is coupled to the first electrode 24 of the radiation source 22, and a second end 44 that is electrically coupled to the second electrode 26 of the radiation source 22.

In operation, the pulsed high voltage power supply circuit 20 supplies a series of substantially uniform high voltage pulses across the first and second electrodes 24 and 26. Each of the high voltage pulses has a relatively high slew rate and dwells above a high voltage for a predetermined period of time so that the on-time of the radiation source 22 may be minimized while providing a sufficient quantity of energetic (i.e., penetrating) radiation to enable the generation of clear, sharp radiographic images. By minimizing the on-time required to form useful radiographic images, the pulsed high voltage power supply 20 minimizes the radiation dosage which is imparted to the target object, which results in improved safety, minimizes the power consumed by the radiation source 22, which enables extended battery powered operation in portable applications, and reduces the operating temperature of the radiation source 22, which reduces operating costs because the life expectancy of the radiation source 22 is substantially increased.

Generally speaking, the pulsed high voltage power supply 20 functions in a manner similar to a flyback converter. The switching circuit 32 alternately switches the second end 40 of the primary winding 34 between a ground or neutral reference potential (i.e., an on interval) and a substantially open circuit condition (i.e., an off interval). When the second end 40 of the primary winding 34 is connected to the ground potential during the on interval, the low voltage power source 30, which may be a substantially direct current supply such as a battery, supplies energy to the primary winding 34. During the on interval, current in the primary winding 34 increases over time in direct proportion to the inductance of the primary winding 34 and the total energy stored in primary winding 34, which exists in the form a magnetic field, is proportional to the time integral of the current flow through the primary winding 34. Thus, by controlling the amount of time associated with the on interval, the amount of energy stored in the primary winding 34 may be precisely controlled.

At the end of each on interval, the switching circuit 32 transitions rapidly to the off interval (i.e., a substantially open circuit condition). Because the voltage across an inductance is proportional to the inductance value multiplied by the time rate of change of the current through the inductance, this rapid transition to the off interval produces a large flyback voltage across the primary winding 34. As is commonly known, the flyback voltage can be significantly greater than the voltage provided by the low voltage power source 30. Additionally, the flyback voltage is further multiplied by the turns ratio of the step up transformer 28 so that the voltage across the secondary winding 36 may be many times greater than the flyback voltage across the primary winding 34. Thus, by using a flyback converter circuit topology, the pulsed high voltage power supply 20 converts energy provided by the low voltage power source 30 into high voltage pulses that cause the radiation source 22 to emit pulses of radiation which may be used to produce real time radiographic images. It should be noted that the amount of energy which is transferred to the secondary winding 36 during the off interval is equal to the energy stored in the primary winding 34, less efficiency losses, during the on interval.

Figure 3:
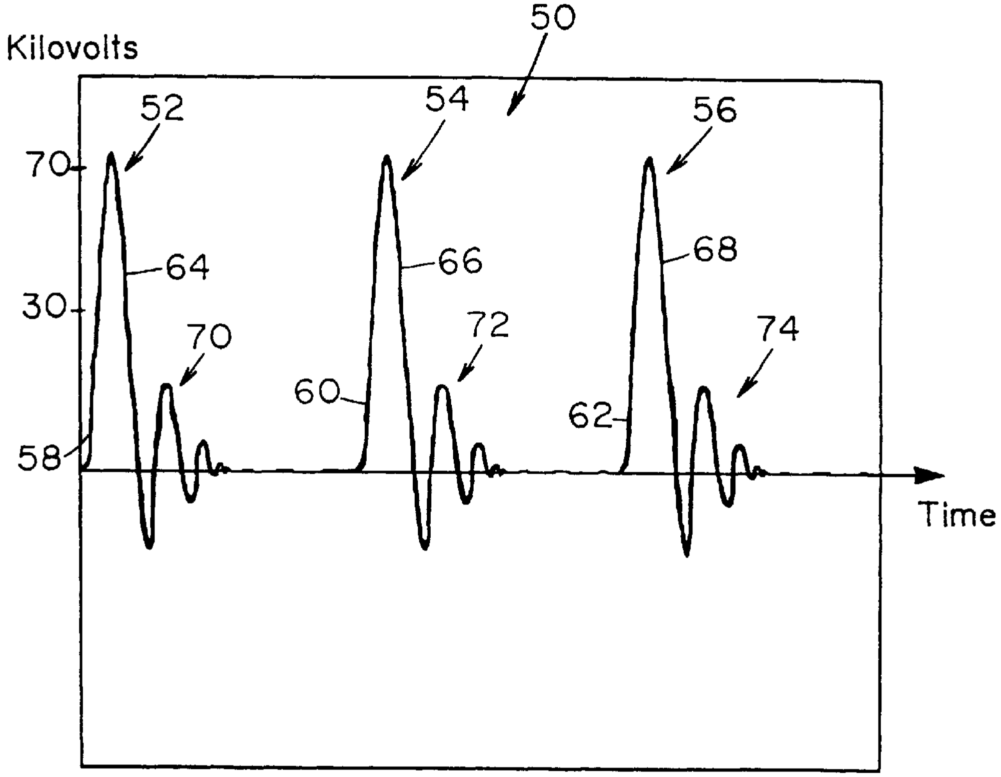
FIG. 3 is an exemplary graphic representation of a high voltage pulse waveform which may be generated using the circuit of FIG. 2.

FIG. 3 is an exemplary graphic representation of a high voltage pulse waveform 50 which may be generated using the circuit of FIG. 2. As shown in FIG. 3, the high voltage pulse waveform 50 includes a series of substantially uniform high voltage pulses 52–56. The high voltage pulses 52–56 have respective leading edges 58–62, each of which coincides with the beginning of an off interval, and trailing edges 64–68. The high voltage pulses 52–56 provide sustained high voltage excitation to the radiation source 22 and may further include ringing portions 70–74 that are damped oscillations. As noted above, each of the high voltage pulses 52–56 contains the energy, less efficiency losses, stored during an on interval immediately preceding the off interval.

The slew rates associated with the leading edges 58–62 and trailing edges 64–68 may be more than 500 volts per microsecond. Such high slew rates allow the high voltage pulses 52–56 to rapidly exceed an excitation voltage that causes the radiation source 22 to generate photons which are sufficiently energetic to penetrate of the target object and which are useful for imaging purposes. However, the slew rate may be higher or lower than 500 volts per microsecond and can be varied to suit any particular application. Additionally, the high slew rate produces a minimal amount of non-penetrating radiation (e.g., soft X-rays) that are absorbed by the target object which is highly desirable, particularly in the case where the target object is a human body. The high voltage pulses 52–56 may have a peak voltage that exceeds 30 kV and may, for example, be as high as about 70 kV to 100 kV. The peak voltages of the high voltage pulses 52–56 are selected in connection with the ratings and performance characteristics of the radiation source 22 so as to not damage the radiation source 22 with an overvoltage condition (which may cause undesirable arc over, severe electrode erosion, etc.) and so that the proportion of high energy (i.e., sufficient energy to penetrate the target object) photons generated by the radiation source 22 is maximized for each pulse of radiation.

Further, because the slew rates of the leading edges 58–62 and trailing edges 64–68 are relatively high, the high voltage pulses 52–56 can produce a sufficient quantity of highly energetic photons for penetration and imaging of the target object in a relatively brief period of time. Thus, the high voltage pulses 52–56 may provide such high voltage excitation (e.g., greater than 30 kV) to the radiation source 22 for about 25 to 70 microseconds. However, other periods of time which are greater than 70 microseconds or less than 25 microseconds may be used as needed to suit particular applications. Generally speaking, the period of time (i.e., the pulse width) is selected to match the bandwidth of the particular radiation detector (e.g., fluoroscope, CCD, etc.) used within the radiography system. This relatively brief excitation period can produce high quality images because a substantial portion of the photons generated by the radiation source 22 during the excitation period are useful for imaging purposes.

Preferably, the high voltage pulses 52–56 repeat at rate which allows for real time radiographic imaging. For example, the high voltage pulses 52–56 may repeat at a rate which is greater than 25 per second so that the radiographic images produced thereby do appear to flicker when view by a user. However, because the pulses 52–56 have a relatively high slew rate and are relatively brief, the high voltage pulses 52–56 may be repeated at a much higher rate, such as greater than 100 per second. On the other hand, for some applications it may be desirable to repeat the high voltage pulses 52–56 at a lower rate which may be, for example, less than 25 per second. In any case, each of the high voltage pulses 52–56 provides a relatively large proportion of penetrating photons for imaging purposes while minimizing the radiation absorbed by the target object. Additionally, the because the pulse durations are relatively short, the power required to produce the high voltage pulses 52–56 is minimized, which allows the radiation source 22 to operate at the lowest possible quiescent temperatures and which tends to extend the useful life of the radiation source 22.

Further, the high slew rates associated with the leading edges 58–62 and the trailing edges 64–68 of the high voltage pulses 52–56 allows the frequency of the high voltage pulses 52–56 to be greater than about 25 pulses per second, which allows for real time imaging while, at the same time, the duty cycle of the pulse waveform 50 may be maintained well below 20%. For instance, using the high voltage pulsed power supply described herein, the high voltage pulses 52–56 may have a duration of about 70 microseconds and may repeat at a rate of 30 per second to yield a duty cycle of about 2%. A low duty cycle is generally desirable because a low duty cycle results in lower power consumption, lower energy dissipation (and heat), which in turn results in longer battery life in battery powered applications, longer life for the radiation source (owing to the lower operating temperature), and allows continuous operation such that the radiography system does not have to be turned off periodically to prevent overheating, which is common with many conventional pulsed power supply radiography systems.

Additionally, oil cooling apparatus, fans, etc. are not required and the radiation source 22 may be safely operated in free air on a continuous basis.

The ringing portions 70–74 of the pulse waveform 50 may be useful in some applications to completely discharge the insulation high voltage cabling that is typically used to route high voltage power within a radiography system. These ringing portions 70–74 include portions that extend below zero volts and serve to fully discharge the capacitance associated with the high voltage cabling. As a result, the insulation requirements for the radiography system can be determined based on alternating current standards rather than direct current standards, which require thicker, bulkier, more expensive cabling. Alternatively, the ringing portions 70–74 may be substantially damped or even substantially eliminated, if desired, to suit a particular application.

Figure 4:
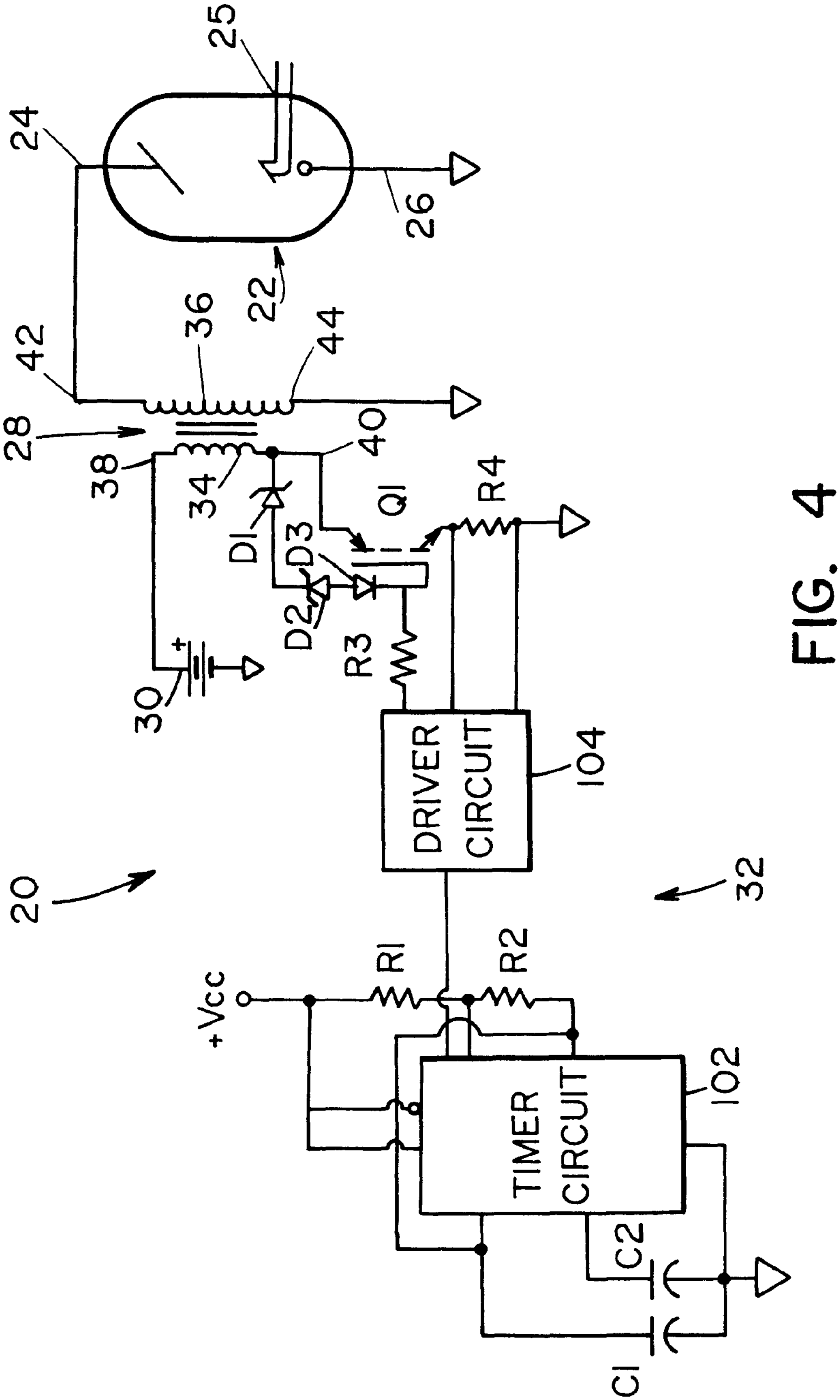
FIG. 4 is a more detailed exemplary schematic diagram of the pulsed high voltage power supply circuit of FIG. 2.

FIG. 4 is a more detailed exemplary schematic diagram of the pulsed high voltage power supply circuit 20 of FIG. 2. In particular, the switching circuit 32 includes a timer circuit 102 that generates a series of low voltage pulses having a frequency and duty cycle that is determined by capacitors C1 and C2 and resistors R1 and R2. A driver circuit 104 uses the series of low voltage pulses provide by the timer circuit 102 to generate a switching signal that turns power transistor Q1 on and off to accomplish the above-described flyback conversion of the low voltage power source 30, which is shown by way of example only as a battery, into a series of substantially uniform high voltage pulses across the electrodes 24 and 26 of the radiation source 22.

The timer circuit 102 may be, for example, a conventional integrated circuit (IC) timer such as a 555 type timer. However, any other timer circuit or pulse generation circuit may be used to generate the low voltage pulse waveform for the driver circuit 104. Additionally, the output of the timer circuit 102 may be adapted to allow a user to adjust the frequency and/or duty cycle of the low voltage pulse waveform either manually or automatically as needed to suit a particular application.

The driver circuit 104 may be, for example, an IC driver that has been specifically adapted to provide drive signals via a base resistor R3 to the base/gate terminal of power transistor Q1. Additionally, the driver circuit 104 may include a current feedback input that senses the current flowing through the transistor Q1 via current sense resistor R4. One commercially available IC driver that may be used as a part of the driver circuit 104 is the CS-8312 pre-driver for an insulated gate bipolar junction transistor (IGBT), which is manufactured by Cherry Semiconductor Corporation of East Greenwich, R.I.

The power transistor Q1 is preferably an IGBT, but may alternatively be any power transistor that provides suitable switching characteristics so that the current flow in the primary 34 can be rapidly switched off to produce a high slew rate high voltage pulse across the secondary winding 36. A voltage clamp circuit including zener diodes D1 and D2 and diode D3 may optionally be provided to limit the flyback voltage that is developed across the primary winding 34. As is known, the diodes D1 and D2 provide a voltage dependent negative feedback from the collector terminal to the base/gate terminal of the power transistor Q1. This voltage dependent negative feedback tends to limit the collector voltage to approximately the sum of the zener voltages of the zener diodes D1 and D2. Thus, various combinations of zener voltages (including adding additional zener diodes) may be selected to achieve any desired clamp voltage for the flyback voltage across the primary winding 34, which may be desirable to prevent an overvoltage condition across the power transistor Q1.

The high voltage step up transformer 28 preferably has a high turns ratio which may, for example, be greater than about 50:1. However, other turns ratios may used. Additionally, the high voltage step up transformer 28 is selected to provide a high slew rate pulse waveform across the electrodes 24 and 26 of the radiation source 22. While a variety of step up transformer designs may be suitable for use with the pulsed high voltage power supply described herein, automotive ignition coils have been found to provide a particularly rugged and low cost manner of switching a substantial amount of energy at high slew rates. Many commercially available automotive ignition coils are capable of generating high voltage pulses in excess of 40 kilovolts. In fact, recently developed powered core automotive ignition coils can produce pulses of up to 100 kilovolts. In any case, a wide variety of automotive ignition coils may be readily adapted for use as a high voltage step up transformer with the pulsed high voltage power supply described herein. Automotive ignition coils are well-suited to the high energy requirements, rapid rise times, high durability/reliability, etc.

Figure 5:
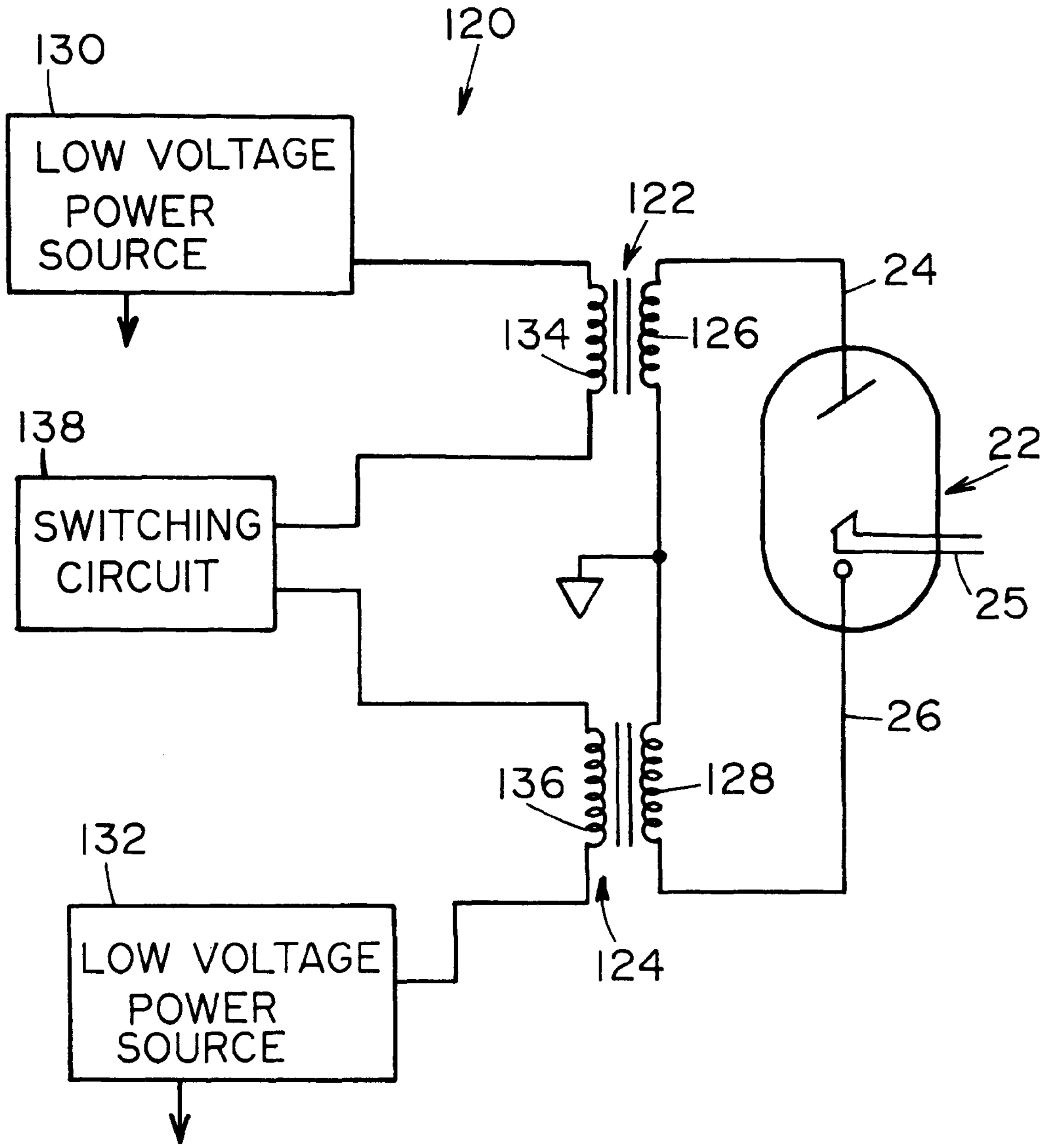
FIG. 5 is an exemplary schematic block diagram of an alternative configuration for a pulsed high voltage power supply which may be used to supply power to a radiation source within a radiography system.

FIG. 5 is an exemplary schematic block diagram of an alternative flyback type configuration 120 for a pulsed high voltage power supply, which may be used to provide the high slew rate high voltage pulses described herein to the radiation source 22. The alternative configuration 120 includes a pair of high voltage step up transformers 122 and 124 that have respective secondary windings 126 and 128, which are coupled to respective ones of the electrodes 24 and 26. Additionally, a pair of low voltage power sources 130 and 132 are coupled to respective primary windings 134 and 136 and a switching circuit 138 is coupled to the primary windings 136 and 134.

In operation, the switching circuit 138 provides a pair of synchronized switching signals to the primary windings 134 and 136 to generate a pair of synchronized high voltage pulses of opposite polarity across the secondary windings 126 and 128. Because these high voltage pulses are of opposite polarity, the voltage drop across the electrodes 24 and 26 is equal to the sum of the magnitudes of the voltages across the secondary windings 126 and 128. Thus, the alternative circuit 120 allows one manner of increasing the voltage drop across the radiation source 22 in applications where, for example, the voltage ratings of a single commonly available step up transformer and/or the voltage ratings of switching circuit components within the switching circuit 138 would be inadequate to provide the high voltage levels required by the radiation source 22.

Those of ordinary skill in the art will readily appreciate that a range of changes and modifications can be made to the preferred embodiments described above. The foregoing detailed description should be regarded as illustrative rather than limiting and the following claims, including all equivalents, are intended to define the scope of the invention.

What is claimed is:

1. A pulsed high voltage power supply for use in a radiography system having a photonic radiation source with first and second electrodes, the pulsed high voltage power supply comprising:

a high voltage step up transformer having a primary winding with first and second ends and a secondary winding connected to the first electrode;

a low voltage power source coupled to the first end of the primary winding; and a switching circuit coupled to the second end of the primary winding that generates a switching signal having a series of pulses, wherein each pulse from the series of pulses causes the high voltage step up transformer to apply a high voltage pulse to the first electrode of the photonic radiation source to form a series of substantially uniform high voltage pulses across the first and second electrodes of the photonic radiation source.

2. The pulsed high voltage power supply of claim 1, wherein the substantially uniform high voltage pulses repeat at a rate of greater than about 25 per second to form a high voltage pulse waveform having a duty cycle of less than about 20%.

3. The pulsed high voltage power supply of claim 1, wherein the high voltage step up transformer further generates a damped oscillating waveform immediately following each of the high voltage pulses from the series of substantially uniform high voltage pulses.

4. The pulsed high voltage power supply of claim 1, wherein each pulse from the series of substantially uniform high voltage pulses has a peak voltage of greater than about 5 kilovolts.

5. The pulsed high voltage power supply of claim 1, wherein each pulse from the series of substantially uniform high voltage pulses provides a voltage greater than about 5 kilovolts for greater than about 25 microseconds.

6. The pulsed high voltage power supply of claim 1, wherein the substantially uniform high voltage pulses repeat at a rate of greater than about 100 per second.

7. The pulsed high voltage power supply of claim 1, wherein the photonic radiation source is an X-ray tube.

8. The pulsed high voltage power supply of claim 7, wherein the X-ray tube is a non-gridded X-ray tube.

9. The pulsed high voltage power supply of claim 1, wherein the low voltage power source is a substantially direct current power source.

10. The pulsed high voltage power supply of claim 9, wherein the low voltage power source is a battery.

11. The pulsed high voltage power supply of claim 1, wherein the high voltage step up transformer has a turns ratio of greater than about 50:1.

12. The pulsed high voltage power supply of claim 1, wherein the first electrode is an anode and the second electrode is a cathode.

13. The pulsed high voltage power supply of claim 1, wherein each pulse from the series of substantially uniform high voltage pulses has slew rate of greater than about 500 volts per microsecond.

14. The pulsed high voltage power supply of claim 1, further comprising a timer circuit coupled to the switching circuit.

15. The pulsed high voltage power supply of claim 14, wherein the timer circuit generates a series of low voltage pulses at a predetermined frequency.

16. A pulsed high voltage power supply for use in a radiography system having a non-gridded X-ray tube with an anode electrode and a cathode electrode, the pulsed high voltage power supply comprising:

a high voltage step up transformer having a primary winding with first and second ends and a secondary winding connected to at least one of the anode and cathode electrodes, wherein the high voltage step up transformer has a turns ratio of greater than about 50:1;

a low voltage substantially direct current power source coupled to the first end of the primary winding; and a switching circuit coupled to the second end of the primary winding that generates a switching signal having a series of low voltage pulses, wherein each pulse from the series of low voltage pulses causes the high voltage step up transformer to apply a high voltage pulse to one of the anode and cathode electrodes to form a series of substantially uniform high voltage pulses across the anode and cathode electrodes and wherein the substantially uniform high voltage pulses repeat at a rate of greater than about 25 per second to form a high voltage pulse waveform having a duty cycle of less than about 20%.

17. The pulsed high voltage power supply of claim 16, wherein the high voltage step up transformer further generates a damped oscillating waveform immediately following each of the high voltage pulses from the series of substantially uniform high voltage pulses across the anode and cathode electrodes.

18. The pulsed high voltage power supply of claim 16, wherein each pulse from the series of substantially uniform high voltage pulses has a peak voltage of greater than about 5 kilovolts.

19. The pulsed high voltage power supply of claim 16, wherein each pulse from the series of substantially uniform high voltage pulses provides a voltage of greater than about 5 kilovolts for greater than about 25 microseconds.

20. The pulsed high voltage power supply of claim 16, wherein the low voltage substantially direct current power source is a battery.

21. The pulsed high voltage power supply of claim 1, wherein the secondary winding is directly connected to the first electrode.

22. The pulsed high voltage power supply of claim 16, wherein the secondary winding is directly connected to at least one of the anode and cathode electrodes.

* * * * *